(12) United States Patent
Chang

(10) Patent No.: US 7,677,680 B1
(45) Date of Patent: Mar. 16, 2010

(54) DRAWER LATCH MECHANISM

(75) Inventor: Lin-Wei Chang, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 12/389,387

(22) Filed: Feb. 20, 2009

(30) Foreign Application Priority Data

Sep. 18, 2008 (TW) .............................. 97135858 A

(51) Int. Cl.
*A47B 88/00* (2006.01)
(52) U.S. Cl. ........................................ 312/333; 211/26
(58) Field of Classification Search ............. 312/330.1, 312/333, 334.4, 223.1, 215, 216, 222; 361/679.02, 361/679.58, 724, 725, 726, 727; 211/26; 292/137, 146, 150, 177, 179
See application file for complete search history.

(56) References Cited

U.S. PATENT DOCUMENTS

| | | | | |
|---|---|---|---|---|
| 6,373,707 B1 * | 4/2002 | Hutchins | .................... | 361/725 |
| 6,378,966 B1 * | 4/2002 | Baker et al. | .................. | 312/333 |
| 6,398,041 B1 * | 6/2002 | Abbott | ........................ | 211/26 |
| 2003/0160010 A1 * | 8/2003 | Robertson | ..................... | 211/26 |
| 2004/0056572 A1 * | 3/2004 | Chen et al. | ................... | 312/333 |
| 2004/0086252 A1 * | 5/2004 | Smith et al. | .................. | 385/135 |
| 2007/0284981 A1 * | 12/2007 | Cheng | ..................... | 312/334.1 |

\* cited by examiner

*Primary Examiner*—James O Hansen
(74) *Attorney, Agent, or Firm*—CKC & Partners Co., Ltd.

(57) ABSTRACT

This present invention relates to a drawer latch mechanism, implementing to a drawer for removable hard drives in a server computer. The drawer latch mechanism comprises a latch member, which extends from the front edge of the drawer to the lateral edge of the drawer. The latch member is installed on the front edge of the drawer to be moved back and forth thereon. The latch member is applied to insert to a corresponding a lock hole to secure the drawer to a drawer shelf. The drawer latch mechanism further comprises a swivel member to withdraw the latch member from the lock hole.

12 Claims, 5 Drawing Sheets

DRAWER LATCH MECHANISM

RELATED APPLICATIONS

This application claims priority to Taiwan Application Serial Number 97135858, filed Sep. 18, 2008, which are herein incorporated by reference.

BACKGROUND

1. Field of Invention

The present invention relates to a drawer latch mechanism. More particularly, the present invention relates to a latch mechanism of a drawer for accommodating removable sever hard drives.

2. Description of Related Art

FIG. 1 illustrates a conventional drawer latch mechanism, which has two parallel guide columns 21 located on a front edge 20 of a drawer. A latch member 10 has two guide slots 11 to respectively engage with two guide columns 21 such that the latch member 10 can be slid along the front edge 20 of the drawer back and forth to lock or unlock the drawer to a drawer shelf.

The latch member 10 has a handle 12 for users to be exerted force upon such that the latch member 10 can be pulled against a resilient spring 14 to unlock the drawer. The handle 12 needs to be long enough at least for fingers to exert force upon such that the handle 12 usually occupies more space. For the forgoing reasons, there is a need for improving the drawer latch mechanism.

SUMMARY

It is therefore an objective of the present invention to provide an improved drawer latch mechanism.

In accordance with the foregoing and other objectives of the present invention, a drawer latch mechanism is provided for securing a drawer to a lock hole of a drawer shelf. The drawer latch mechanism includes a latch member, a resilient recovery unit, a first horizontally positioning, a second horizontally positioning unit and a swivel member. The latch member includes the following components. A front portion is disposed in contact with a front edge of the drawer. An extension portion is connected to the front portion and extends along a lateral edge of the drawer. A latch end is bent from the extension portion to be inserted into the lock hole of the drawer shelf. Two slots are formed at one end of the front portion. The resilient recovery unit is disposed on the front portion and the front edge of the drawer to provide a recovery force to the latch member. The first horizontally positioning unit is disposed on the front portion and the front edge of the drawer to limit the latch member to slide back and forth along the front edge of the drawer. The second horizontally positioning unit is disposed on the extension portion and the lateral edge of the drawer to further limit the latch member to slide back and forth along the front edge of the drawer. The swivel member is pivotally connected with the front edge of the drawer and coupled with the two slots to drive the latch member against the recovery force so as to pull the latch end out of the lock hole of the drawer shelf.

Thus, the present invention provides a drawer latch mechanism, which is equipped with a swivel member to exert a force to slide the latch member. The swivel member is designed to be long enough to increase drive force toward the latch member and can be laid against the swivel member to occupy less space when the latch member is not used to drive the latch member.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further to understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
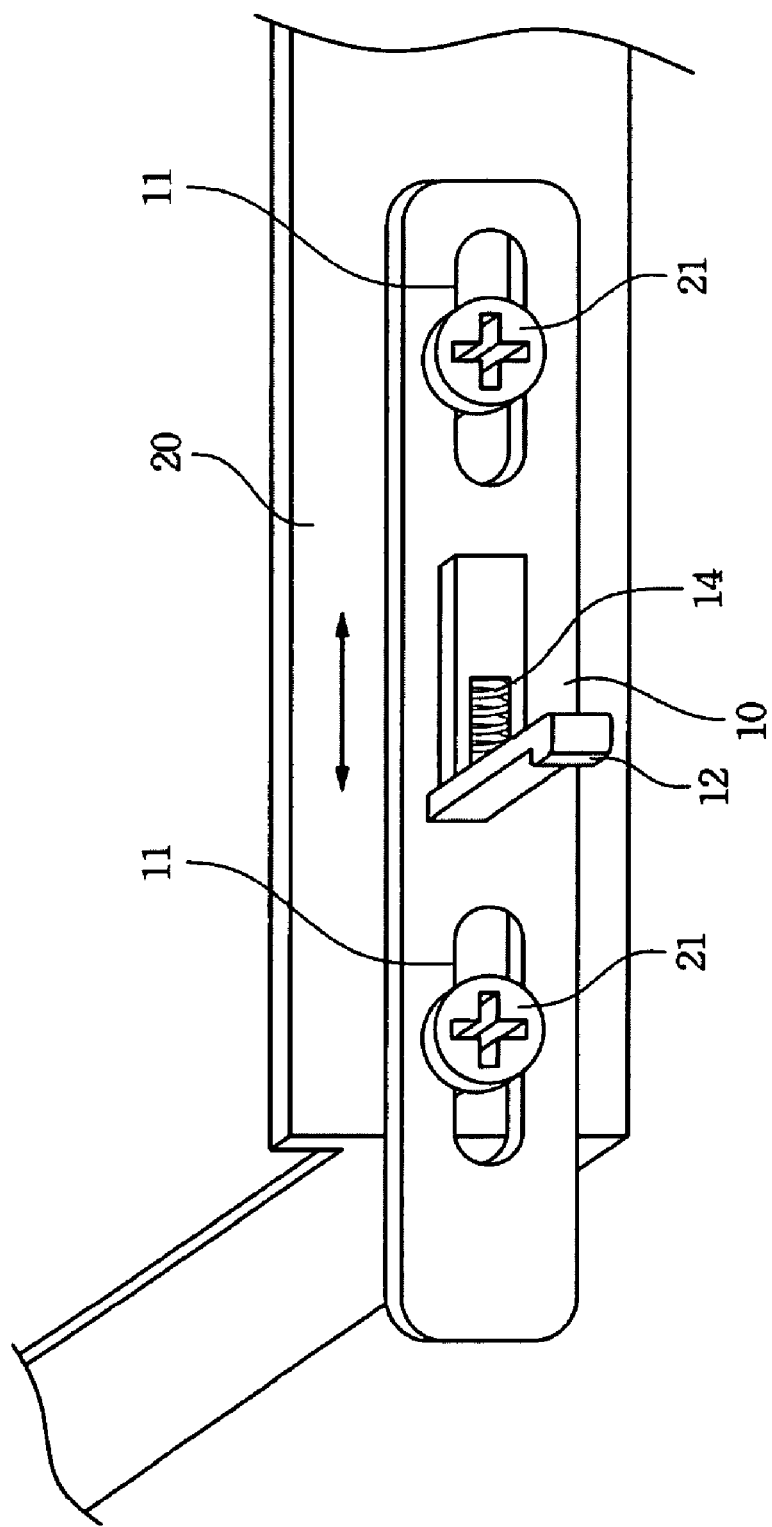
FIG. 1 illustrates a conventional drawer latch mechanism.

Reference will now be made in detail to the present preferred embodiments of the invention, examples of which are illustrated in the accompanying drawings. Wherever possible, the same reference numbers are used in the drawings and the description to refer to the same or like parts.

Figure 2:
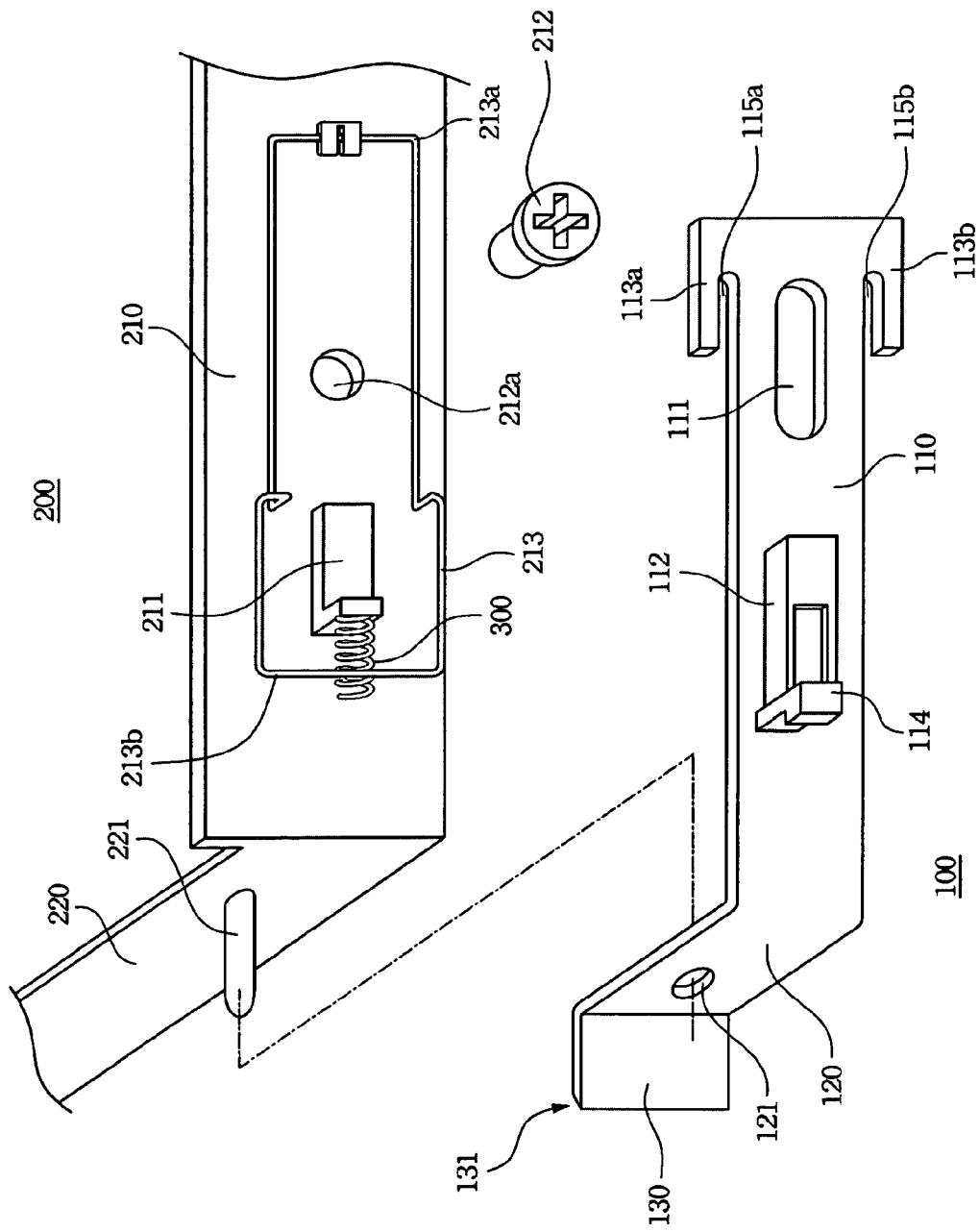
FIG. 2 illustrates an exploded view of a drawer latch mechanism according to one preferred embodiment of this invention.
Figure 3:
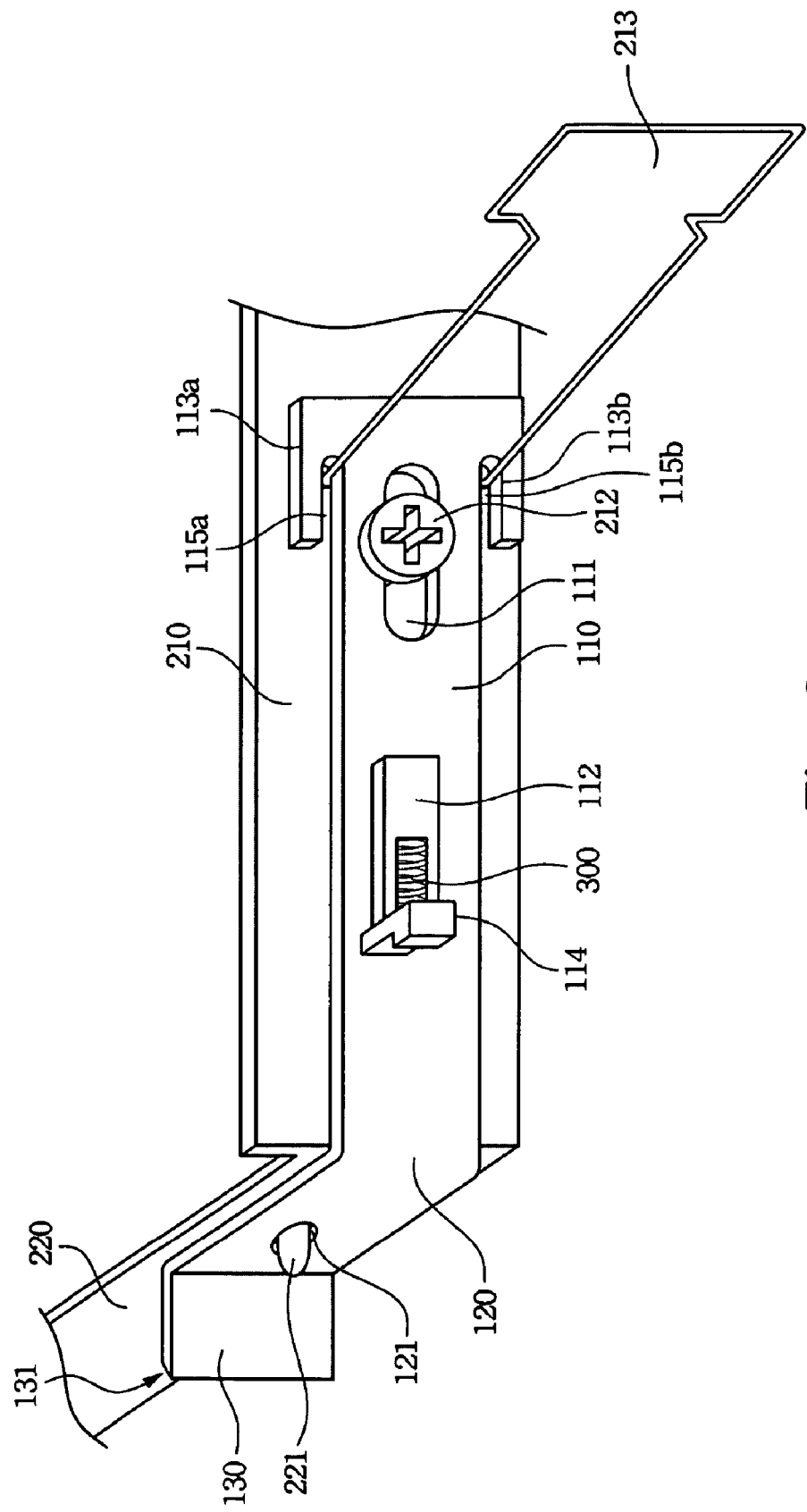
FIG. 3 illustrates the drawer latch mechanism in FIG. 2 in an assembly status; and FIG. 4

FIG. 2 illustrates an exploded view of a drawer latch mechanism according to one preferred embodiment of this invention. FIG. 3 illustrates the drawer latch mechanism in FIG. 2 in an assembly status. The drawer latch mechanism includes a latch member 100 assembled to a corner of a drawer 200. The latch member 100 includes a front portion 110, an extension portion 120, a latch end 130 and two slots (115a, 115b) to form a single unitary component. The front portion 110 is disposed in contact with a front edge 210 to of the drawer 200. The extension portion 120 bends from an end of the front portion 110 and extends along a lateral edge 220 of the drawer 200. The latch end 130 bends from an end of the extension portion 120. The extension portion 120 is substantially perpendicular to the front portion 110, and the latch end 130 is substantially perpendicular to the extension portion 120. Thus, the latch end 130 is substantially in parallel with the front portion 110. The extension portion 120 and the two slots (115a, 115b) are disposed at two opposite ends of the front portion 110. The two slots (115a, 115b) are formed on a pair of opposite protrusions (113a, 113b) at the end of the front portion 110.

The front portion 110 has a latch housing 112, which includes an accommodation space facing the front edge 210 of the drawer 200. A side wall of the latch housing 112 protrudes out as a fastener 114. The front portion 110 also has a guide slot 111. The extension portion 120 is shorter than the front portion 110, and has a guide hole 121 in its central section.

Figure 4:
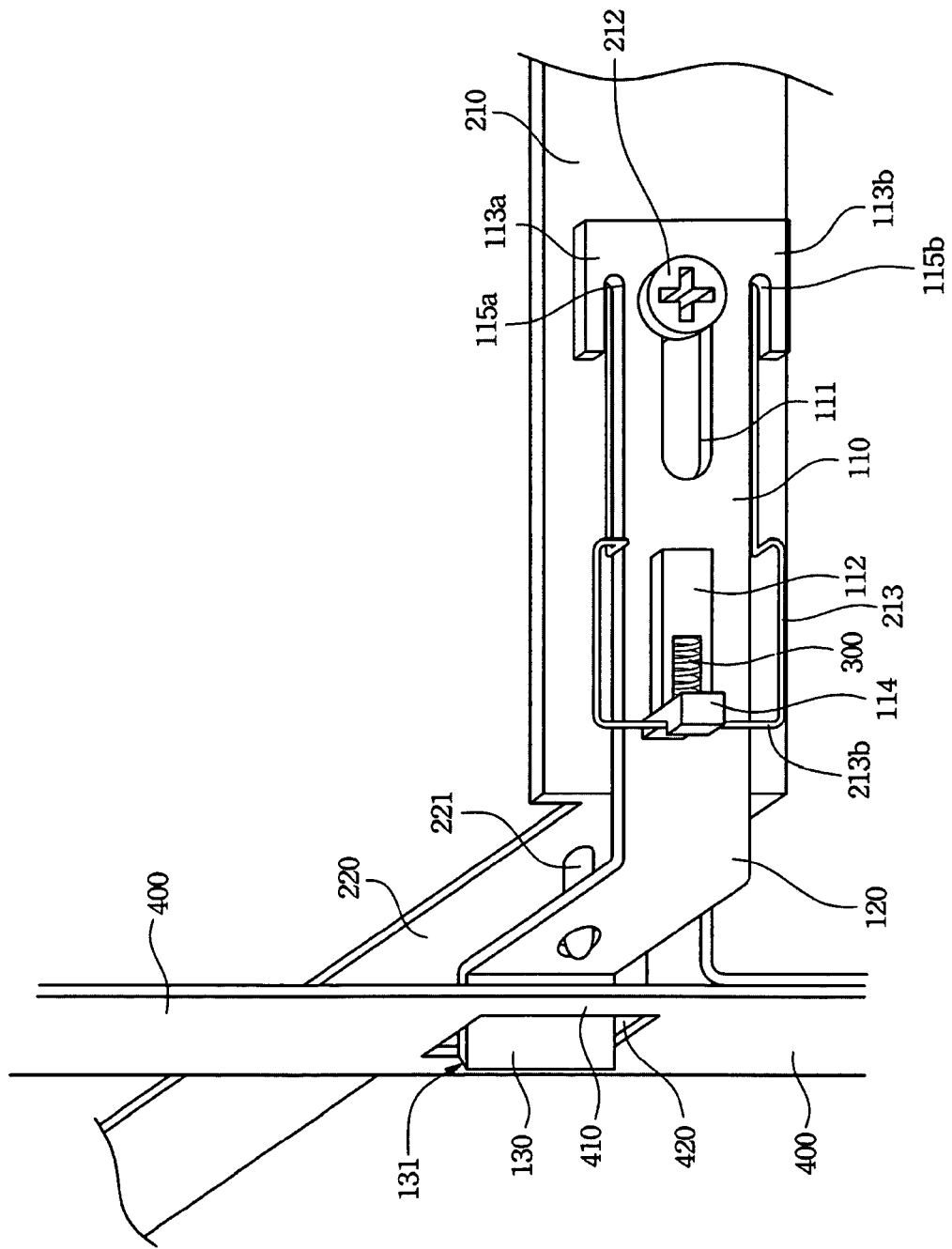

The latch end 130 is operable to be inserted into a lock hole 420 of a drawer shelf 400 (see FIG. 4). The latch end 130 has inclined surface 131 to interfere with the wall 410 for easily inserted into the lock hole 420 when the latch end 130 is being inserted into the lock hole 420.

A block 211 is located on the front edge 210 of the drawer 200 to be placed within the accommodation space of the latch housing 112. A resilient spring 300, which has an end secured to the block 211 and an opposite end against an inner wall of the latch housing 112, is also disposed within the latch housing to provide a recovery force for the latch member 100 when the latch member 100 is pulled out of the lock hole 420 of the drawer shelf 400. The block 211, the latch housing 112 and the resilient spring 300 can be regarded as a resilient recovery unit for the drawer latch mechanism in the present invention.

A guide column 212 (such as a bolt) is screwed into a screw hole 212a on the front edge 210 of the drawer 200. The guide column 212 engages with the guide slot 111 of the latch member 100 such that the latch member 100 can be slid back and forth along the front edge 210 of the drawer 200. The guide column 212 and the guide slot 111 can be referred as a first horizontally positioning unit for the latch member 100.

A protrusion column 221 is located on the lateral edge 220 of the drawer 200 to engage within the guide hole 120 of the latch member 100. The protrusion column 221 has a round end for easily insert into the guide hole 121 such that the latch member 100 can be further guided to slide along the front edge 210 of the drawer 200 back and forth. The protrusion column 221 and the guide hole 120 can be regarded as a second horizontally positioning unit for the latch member 100 in addition to the first horizontally positioning unit.

The swivel member 213 can be a metallic wire of the symbol "凸", which has a top section 213a pivotally connected with the front edge 210 of the drawer 200, such that the swivel member 213 can be swiveled relative to the front edge 210. The swivel member 213 is coupled with the two slots (115a, 115b) of two protrusions (113a, 113b) to drive the latch member 100 against a recovery force (of the resilient spring 300) so as to pull the latch end 130 out of the lock hole 420 of the drawer shelf 400. The latch member 100 may be or may not be with to equipped the slot (115a or 115b) to be driven by the swivel member 213. Without the slot (115a or 115b), the swivel member 213 is still properly coupled with the two protrusions (113a, 113b) to drive the latch member 100. When the swivel member 100 is swiveled to be laid against the front portion 110, the metallic wire of the symbol "凸" has its bottom section 213b engaging the is fastener 114 (as illustrated in FIG. 4).

The first and second horizontally positioning units are to guide and limit the latch member 100 to slide along the front edge 210 of the drawer 200 back and forth. The resilient recovery unit is to provide a recovery force for the latch member 100 to maintain the latch end 130 to engage into the lock hole 420 of the drawer shelf 400 such that the drawer 200 can be secured to the drawer shelf 400.

Figure 5:
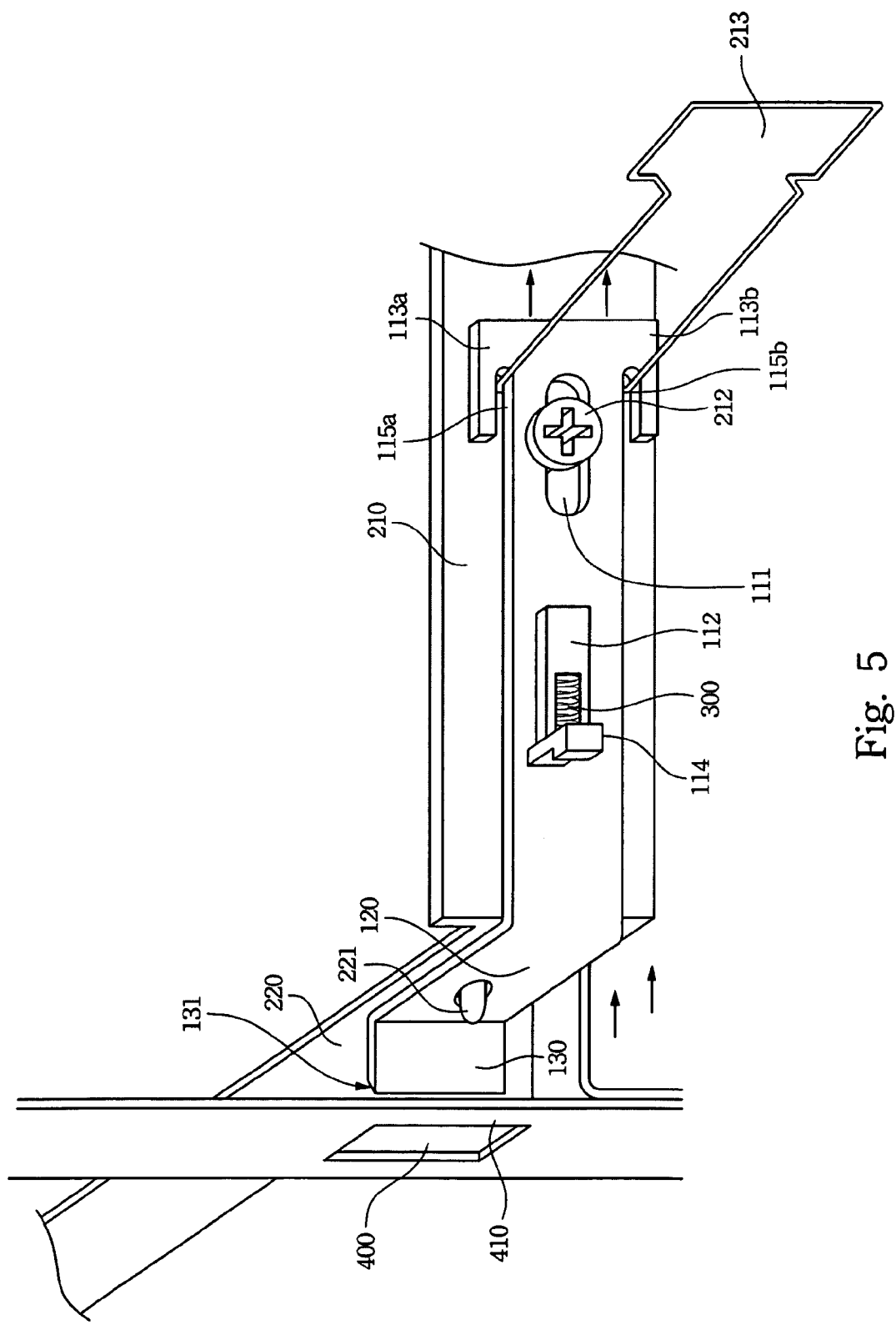
FIG. 5 illustrates two operation statuses of a drawer latch mechanism according to one preferred embodiment of this invention.

FIG. 4 and FIG. 5 illustrates two operation statuses of a drawer latch mechanism according to one preferred embodiment of this invention. FIG. 4 illustrates a lock status of the latch member 100. The resilient recovery unit provides a recovery force for the latch member 100 to insert the latch end 130 into the lock hole 420 of the drawer shelf 400. In such lock status of the latch member 100, the swivel member 213 did not exert any force to the two slots (115a, 115b) and the swivel member 213, which is a metallic wire of the symbol "凸", has its bottom section 213b engaging the fastener 114. When the swivel member 100 is laid against the front portion 110, the swivel member 100 occupies less space than a conventional handle 12 does (as illustrated in FIG. 1). FIG. 5 illustrates an unlock status of the latch member 100. In such unlock status of the latch member 100, the drawer 200 can be pulled out or pushed into the drawer shelf 400 at will. The swivel member 213 is swiveled upright relative to the front edge 210 of the drawer 200 to exert force to the two slots (115a, 115b) such that the latch member 100 is driven against the recovery force of the resilient spring 300 so as to pull the latch end 130 out of the lock hole 420 of the drawer shelf 400.

According to discussed embodiments, the present invention provides a drawer latch mechanism, which is equipped with a swivel member to exert a force to slide the latch member. The swivel member is designed to be long enough to increase drive force toward the latch member and can be laid against the swivel member to occupy less space when the latch member is not used to drive the latch member.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A drawer latch mechanism for securing a drawer to a lock hole of a drawer shelf, the drawer latch mechanism comprising:
   a latch member comprising:
      a front portion disposed in contact with a front edge of the drawer;
      an extension portion connected to the front portion and extending along a lateral edge of the drawer;
      a latch end being bent from the extension portion to be inserted into the lock hole of the drawer shelf; and
      two slots formed at one end of the front portion;
   a resilient recovery unit disposed on the front portion and the front edge of the drawer to provide a recovery force to the latch member;
   a first horizontally positioning unit disposed on the front portion and the front edge of the drawer to limit the latch member to slide back and forth along the front edge of the drawer;
   a second horizontally positioning unit disposed on the extension portion and the lateral edge of the drawer to further limit the latch member to slide back and forth along the front edge of the drawer; and
   a swivel member pivotally connected with the front edge of the drawer and coupled with the two slots to drive the latch member against the recovery force so as to pull the latch end out of the lock hole of the drawer shelf.

2. The drawer latch mechanism of claim 1, wherein the resilient recovery unit comprises:
   a latch housing disposed on the front portion;
   a block disposed on the front edge of the drawer; and
   a resilient spring disposed within the latch housing to provide the recovery force.

3. The drawer latch mechanism of claim 1, wherein the first horizontally positioning unit comprises:
   a guide column disposed on the front edge of the drawer; and
   a guide slot formed on the front portion and slidably connected with the to guide column to limit the latch member to slide within a length of the guide slot.

4. The drawer latch mechanism of claim 1, wherein the second horizontally positioning unit comprises:
   a protrusion column disposed on the lateral edge of the drawer; and
   a guide hole formed on the extension portion and slidably connected with the protrusion column to guide the latch member to slide back and forth.

5. The drawer latch mechanism of claim 4, wherein the protrusion column has a round end for easily insert into the guide hole.

6. The drawer latch mechanism of claim 1, wherein the extension portion is shorter than the front portion.

7. The drawer latch mechanism of claim 1, wherein the latch member is driven against the recovery force so as to pull the latch end out of the lock hole of the drawer shelf when the swivel member is swiveled upright relative to the front portion.

8. The drawer latch mechanism of claim 1, wherein the latch end comprises an inclined surface to interfere with the lock hole when the latch end is being inserted into the lock hole.

9. The drawer latch mechanism of claim 1, wherein the extension portion and the two slots are disposed at two opposite ends of the front portion.

10. The drawer latch mechanism of claim 1, wherein the latch member is a single unitary component.

11. The drawer latch mechanism of claim 1, wherein the extension portion is substantially perpendicular to the front portion, the latch end is substantially perpendicular to the extension portion.

12. The drawer latch mechanism of claim 11, wherein the latch end is substantially in parallel with the front portion.

* * * * *